UNITED STATES PATENT OFFICE.

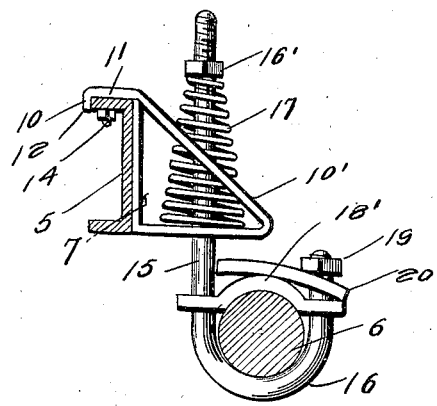
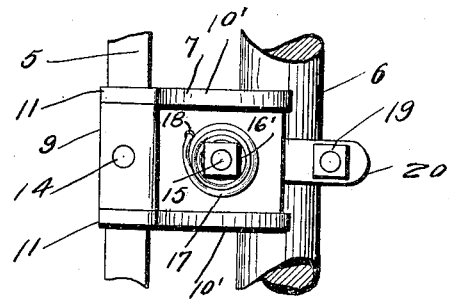
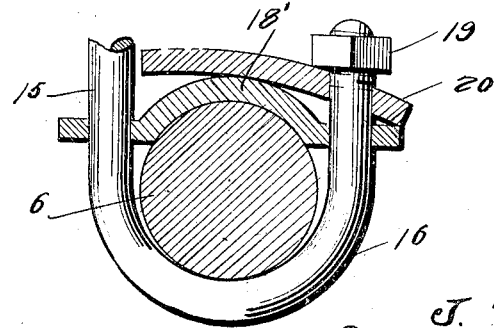

JESSE T. RICHARDS, OF WARRINGTON, FLORIDA.

SHOCK-ABSORBER.

1,348,581.  Specification of Letters Patent.  Patented Aug. 3, 1920.

Application filed November 19, 1919. Serial No. 339,145.

*To all whom it may concern:*

Be it known that I, JESSE T. RICHARDS, a citizen of the United States, residing at Warrington, in the county of Escambia and State of Florida, have invented certain new and useful Improvements in Shock-Absorbers; and I do hereby declare the following to be a full, clear, and exact description of the invention, such as will enable others skilled in the art to which it appertains to make and use the same.

My invention relates to vehicle shock absorbers, its principal object being to provide a shock absorber which may be suspended from the frame of the vehicle in such a manner as to permit the shock absorbing elements to possess a free longitudinal thrust.

A further object of the invention is to provide a shock absorber which is removably mounted upon the frame of the vehicle, the construction being such as to permit the device to be removed from the frame as a whole.

It is another object of this invention to provide a shock absorber wherein the springs may be removed from the device to permit the arrangement of a new spring.

Still another object of the invention is to provide a shock absorber which embodies a new and improved hanger which is constructed from a single strip of metal.

Another object of the invention is to provide a shock absorber that includes an expansible coil spring, the tension of which may be regulated, the spring being disposed so as to permit the engagement of a wrench with the nut engaging the spring.

Another general object of the invention is to provide a shock absorber which is simple in construction, that consists of few parts that may be readily assembled and disassembled and which may be manufactured and sold at a nominal cost.

With the above and other objects and advantages in mind, the invention consists in the combinations of elements, constructions and arrangement, and operations, all of which will be hereinafter enlarged upon and recited in the subjoined claims, one embodiment of the invention being illustrated in the accompanying drawings, wherein—

Figure 1 is a side elevation of the shock absorber in operative position on the vehicle, parts of the vehicle being shown in cross section;

Fig. 2 is a top plan view of the device; and

Fig. 3 is an enlarged detail view showing the manner of connecting the shock absorber with the axle of the vehicle.

Like characters of reference denote like parts in all the views.

The chassis or frame of the vehicle is designated at 5 and one of the axles of the vehicle is designated by the numeral 6. The parts of the vehicle referred to are conventional and are shown merely for the purpose of illustrating the application of my improved shock absorber.

There is provided a hanger or bracket which is constructed from a single blank of metal designated at 7. One end of this blank 7 is bent at right angles to afford a laterally extending clip 9 adapted to engage the upper face of the chassis 5. This laterally extending clip includes a down-turned lip or flange 10 which engages the longitudinal edge of the chassis 5. The strip 7 is bent transversely at approximately its center and extended at right angles and reversely from the part 9. This latter right versely from the part 9. This latter right angularly extending part is formed with parallel obliquely disposed straps or braces 10' at its opposite sides and terminates in clips 11 which extend parallel with the clip 9 and includes a down-turned lip 12. The clip 9 is cut away at its opposite transverse ends to permit the clip 11 to lie flush with the surface of the clip 9.

A fastening 14 extends through the clip 9 and detachably secures the bracket in place on the chassis.

Slidable vertically through the lower outstanding or right angularly extending part of the bracket and between the straps 11 is an axle supporting bolt 15 having a hook 16 formed at the lower end thereof in which is engaged the axle 6. The upper end of this bolt is threaded and engaged thereon is a nut 16'. An expansible shock absorbing spring 17 encircles this end of the bolt and rests against the lower outstanding part of the bracket. The convolutions of the spring 17 increase in diameter toward the lower end of the same and has its extremity anchored in an opening 18 in the bracket. It will be obvious that the function of the nut 16 is to regulate the tension of the spring 17. It will be seen that the straps 11 will not interfere with a wrench or other tool while the tension of the spring is being regulated.

In order to retain the axle engaged with the hook 16 there is provided a strap 18', one end of which is slidably engaged with the shank of the bolt and its opposite end engaged with the end of the hook. A nut 19 is threaded upon the end of the hook to retain the strap in engagement with the axle. A locking plate 20 is provided to prevent the strap from moving on the bolt due to the strain of the axle. This plate 20 lies against the bolt or intermediate part of the strap and has one end engaged upon the extremity of the hook and engaged by the nut.

The embodiment of the invention herein illustrated and described is considered the preferred embodiment of the invention, but it will be understood that the same may be modified in many respects and the limits of such modifications are only governed by the subjoined claims.

What is claimed is:—

1. In a vehicle shock absorber, a bracket having an outstanding part at one end thereof, a clip at the opposite end of the bracket for engagement with the frame of a vehicle, parallel hanger straps formed at the forward end of the outstanding part and extending obliquely toward the clip, the ends of the parallel straps terminating in clips adapted to engage the vehicle frame, a member slidably engaged with the outstanding part adapted to be attached to a vehicle axle, and a coil spring encircling the slidable member and urging the same upwardly.

2. In a vehicle shock absorber, a supporting bracket to be mounted upon the frame of the vehicle, a hook bolt slidable through the bracket, resilient means engaging the bolt and urging the same in one direction, a strap engaged with the hooked end of the bolt for retaining a movable member therein, an abutment on the extremity of the hook, and a locking plate bearing against the strap and held against movement by the abutment.

3. The combination with a horizontal support, of a bracket including right angularly disposed legs, one of which resting against the support, a clip formed at the upper end of said leg and engaging the support, a pair of angularly disposed parallel hanger straps connected with the outer end of the remaining leg of the bracket, and clips carried by the upper end of the hanger strip and engaging the support, and a cushioned member passing through the last mentioned leg of the bracket and adapted to be connected with a vehicle axle.

In testimony whereof I affix my signature in presence of two witnesses.

JESSE T. RICHARDS.

Witnesses:
E. P. CHAFFIN,
WARREN B. AINSWORTH.